Figures 2, 3, 4:
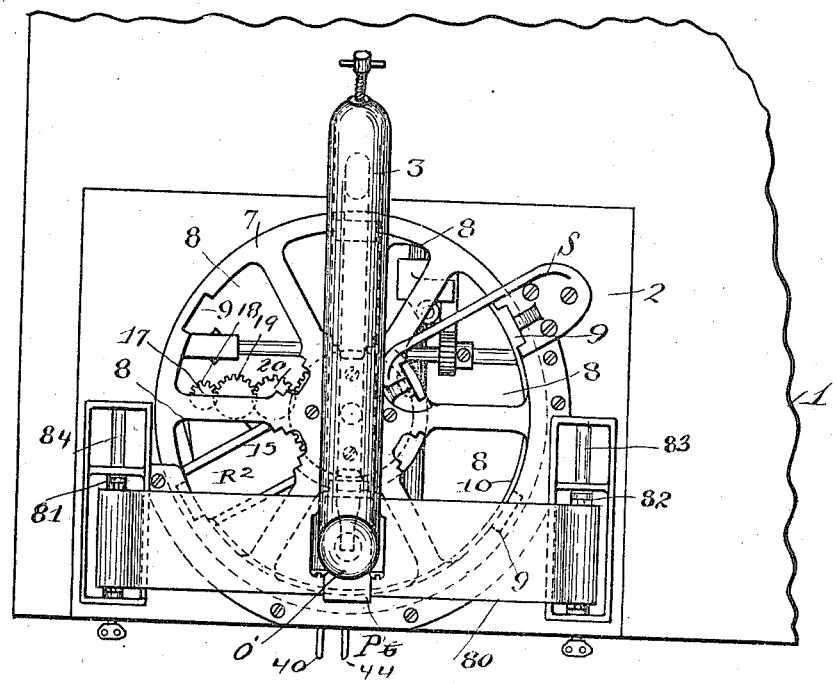

E. H. FREY.
ADDRESSING MACHINE.
APPLICATION FILED NOV. 6, 1911.
1,197,927.
Patented Sept. 12, 1916.
6 SHEETS—SHEET 1.
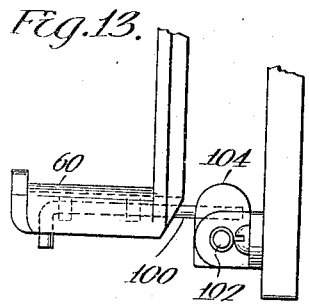
Fig. 13.
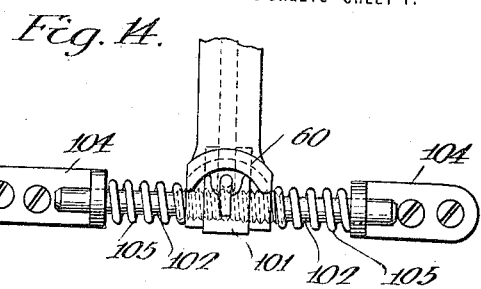
Fig. 14.
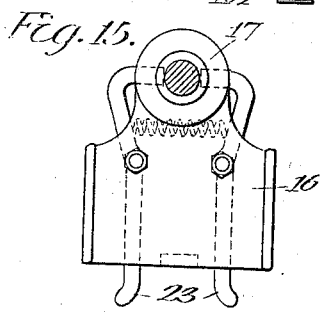
Fig. 15.
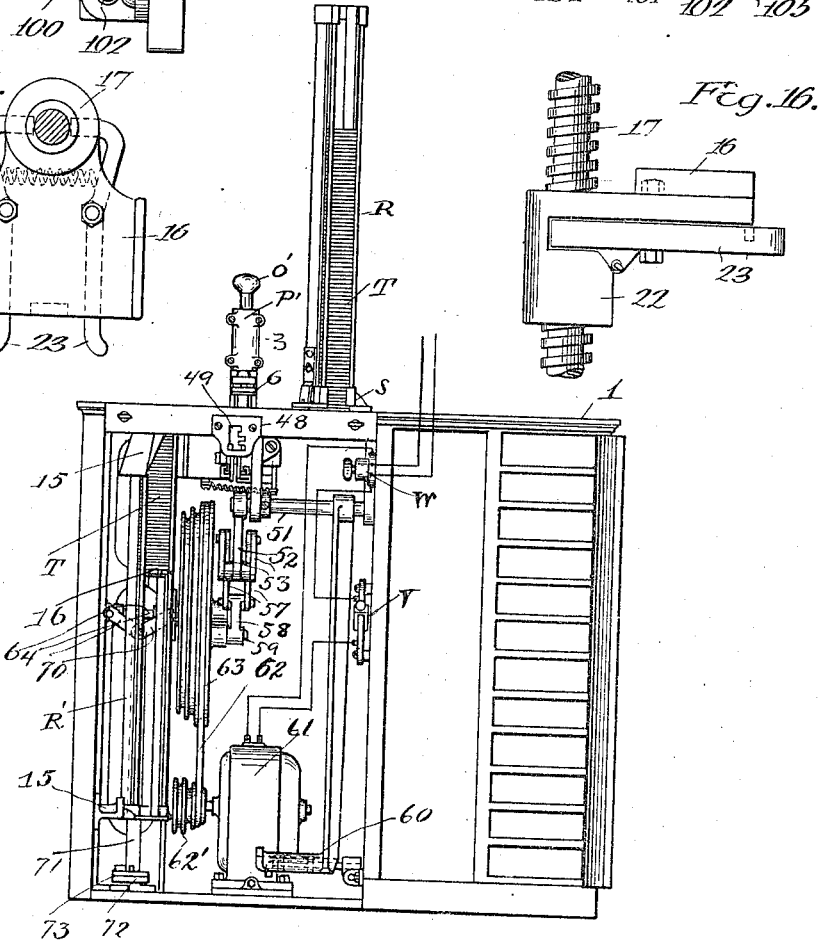
Fig. 16.
Fig. 1
Witnesses:
N. E. Currier
Geo. S. Cole
Inventor
Ernst H. Frey
by Wm. H. Monroe
Attorney

E. H. FREY.
ADDRESSING MACHINE.
APPLICATION FILED NOV. 6, 1911.

1,197,927.

Patented Sept. 12, 1916.
6 SHEETS—SHEET 3.

Witnesses:

Inventor:
Ernest H. Frey
Attorney

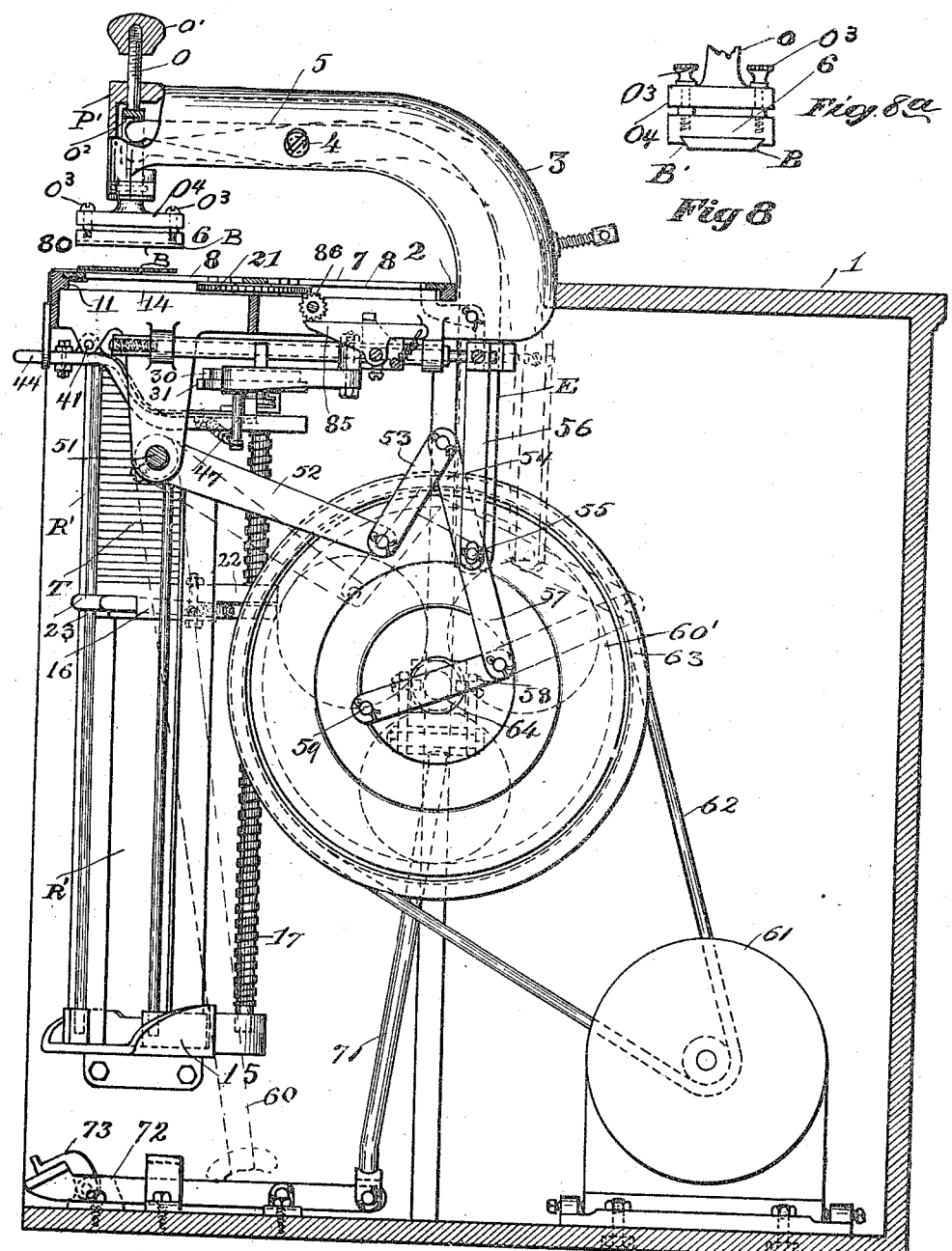

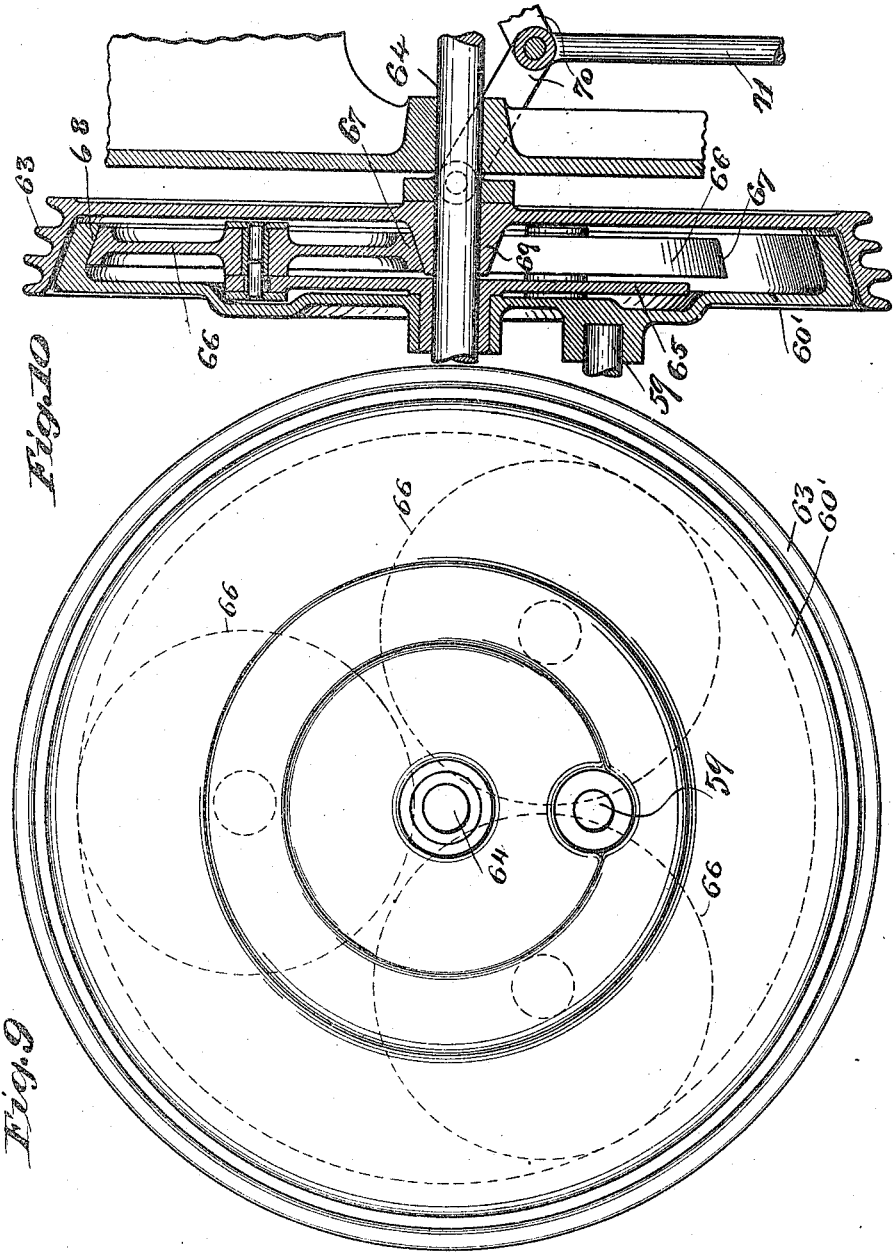

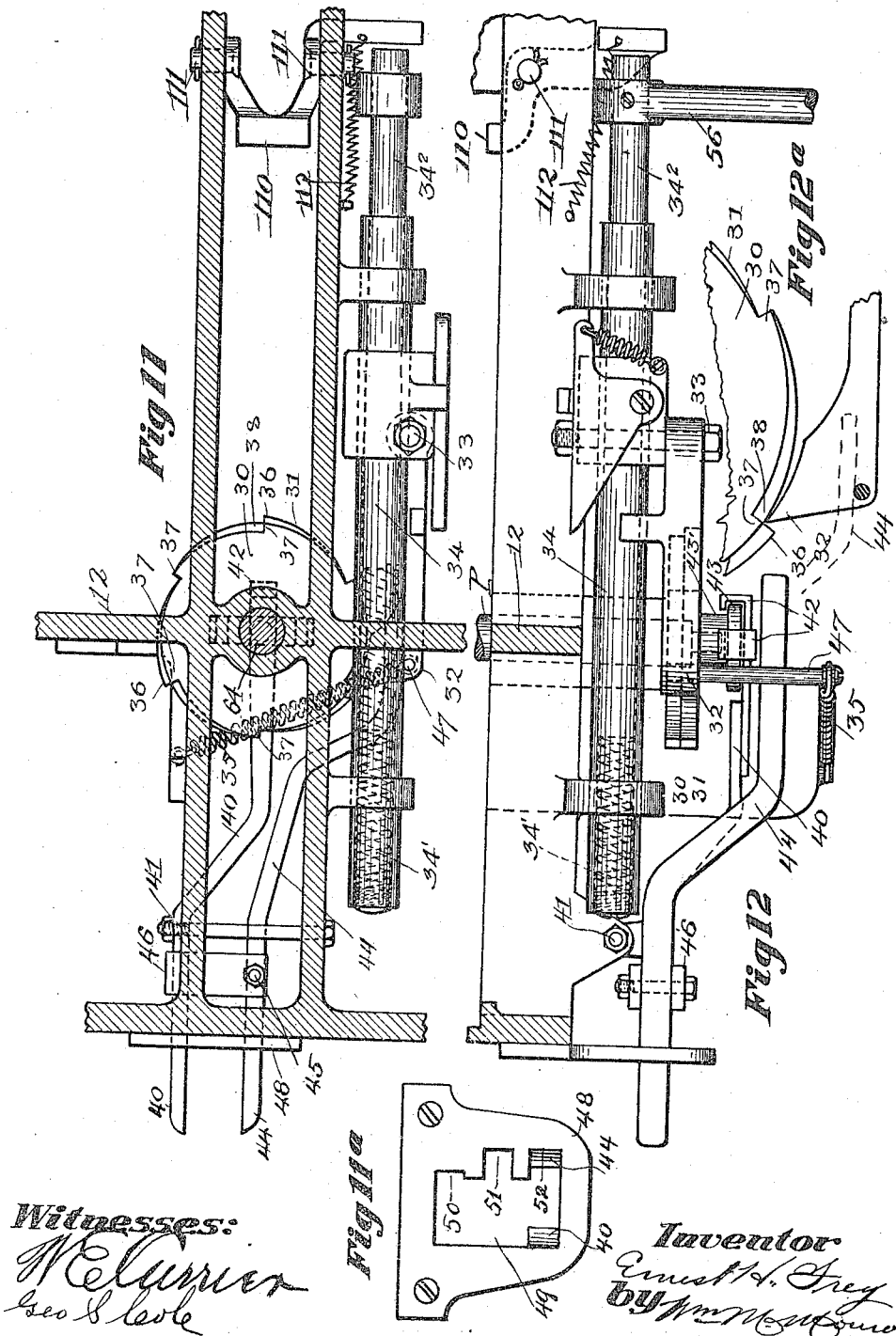

UNITED STATES PATENT OFFICE.

ERNEST H. FREY, OF WILLOUGHBY, OHIO.

ADDRESSING-MACHINE.

1,197,927.

Specification of Letters Patent.   Patented Sept. 12, 1916.

Application filed November 6, 1911.   Serial No. 658,753.

*To all whom it may concern:*

Be it known that I, ERNEST H. FREY, a citizen of the United States, and resident of Willoughby, in the county of Lake and State of Ohio, have invented certain new and useful Improvements in Addressing-Machines, of which I hereby declare the following to be a full, clear, and exact description, such as will enable others skilled in the art to which it appertains to make and use the same.

The objects of the invention are to provide a portable form of printing machine for office use by means of which addresses and other interlineations can be added to typewritten letters, envelops can be addressed and pay rolls or other blank forms can be filled in with ease and work of similar class can be done in large quantities with expedition, which would require a large expenditure of time and labor if done upon a typewriter.

By the use of this machine address cards can be kept at hand and arranged in consecutive order and printed continuously in that order, or one address can be duplicated, or each address can be repeated any desired number of times, as required.

The machine can be operated either by a motor or by means of a treadle at option, and the rate of speed when operated by an electric motor can be controlled by means of a rheostat or other electric controlling means and the motor speed being too high for practical machine work in connection with the manual labor required to furnish the forms to be printed to the machine speed reducing means are employed to reduce the motor speed.

In this machine the printing cards or type holders are stored in series in a suitable receptacle from which they fall by gravity upon a rotatable table and are conveyed to the printing position and platen and from this table they are discharged into a similar receptacle.

The receptacles are interchangeable and the full one below the table can be withdrawn and the empty one substituted therefor. Also any desired series of printing cards can be stored in the upper receptacle and printed in regular order therefrom, and the order will be unchanged when the printing cards are deposited in the lower receptacle. The receptacles are also of such shape that they can be readily stored in the manner of drawers in a cabinet, upon which the machine can be mounted.

The invention further comprises automatically acting mechanism constructed and arranged for operating the machine alternately by treadle power and motor, and speed reducing mechanism for the motor driven parts.

It also comprises ratchet and pawl devices adapted to operate the printing arm and to rotate the table to bring the printing cards successively into the printing position, or to alternately rotate the table and release the same, so that the printing cards will print duplicate impressions or to release the table entirely so that the printing cards will repeat the impression.

The invention also comprises automatically acting devices for lowering the printing cards into the lower receptacle as fast as used, for feeding an inking ribbon to the platen, and for automatically reversing the movement thereof, so as to constantly apply a fresh surface to the type upon the printing card.

The invention also has reference to means for locking the treadle when the motor is in use and for providing a spring resistance therefor when an unusually thick card is to be printed.

The invention further comprises the combination and arrangement of parts and construction of details as hereinafter described, shown in the accompanying drawings and specifically pointed out in the claims.

In the accompanying drawings Figure 1 is a front elevation of the device; Fig. 2 is a plan view thereof; Fig. 3 is a plan view of a portion of one of the rollers for the inking ribbon and shows also spring actuated knob therefor; Fig. 4 is a vertical section of the receptacle showing its position on the bed plate of the machine and the means for releasing the printing cards or type holders to fall upon the platform below through an opening in the revolving table below; Fig.

Figure 5:
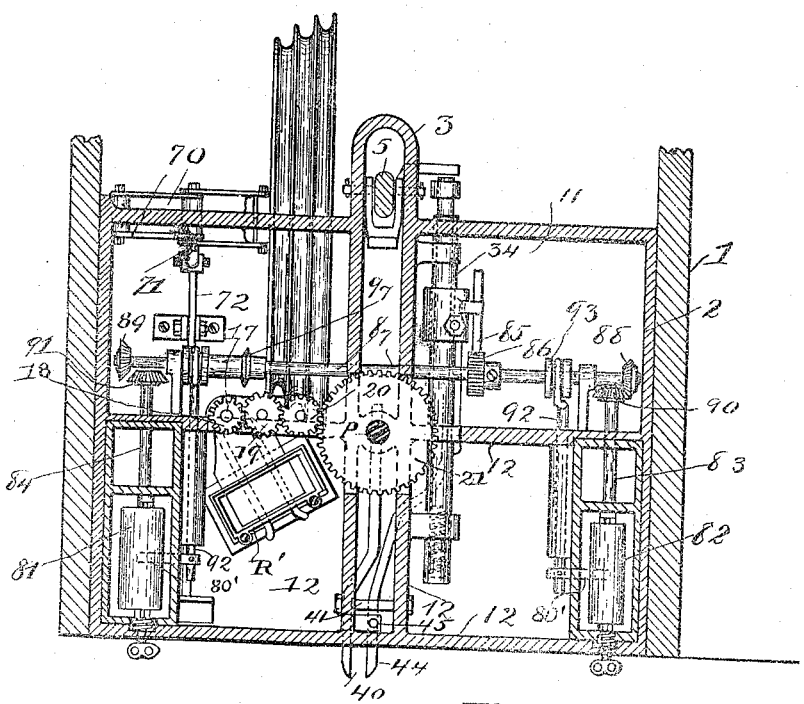
Figure 6:
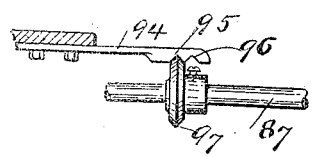
Figure 7:
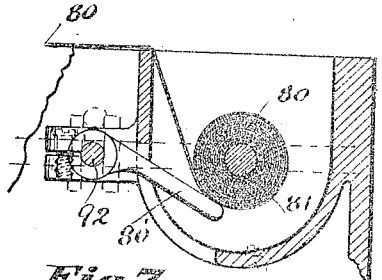

5 is a horizontal section of the machine taken below the revolving table; Fig. 6 is a side elevation of the detaining pawl and disk which locks the gear shifting rod for changing the direction of rotation of the rollers for the inking ribbon; Fig. 7 is a transverse section of one of the inking ribbons and rollers showing the shifting arm and rod operated by the roll of ribbon when its limit of diameter is reached. Fig. 8 is a vertical section of the machine and its cabinet showing the rock arm and link mechanism by means of which the pawl actuating rod is moved to engage the operating ratchets for the revolving table and also by means of which the printing arm is operated. Fig. 8$^a$ is a front view of the platen showing the leather compression surface. Fig. 9 is a face view of the driving disk and pulley showing reducing planet friction gears therein; Fig. 10 is a transverse section thereof showing internal gears and toggle clutch, for forcing the several parts into engagement with each other; Fig. 11 is a horizontal section enlarged from Fig. 5 showing the ratchet wheel and pawl by means of which the revolving table is moved, the rod on which this pawl is mounted, the lever mechanism for raising and lowering the lower ratchet wheel, the locking dog for the revolving table, and the operating pawl for the gear shifting shaft of the ribbon rollers; Fig. 11$^a$ is a face view of the controlling plate for the levers which raise and lower the lower ratchet wheel and which is provided with locking grooves at three levels; Fig. 12 is a vertical section of the structure shown in Fig. 11; Fig. 12$^a$ is a detail of the two ratchet wheels and the operating pawl; Fig. 13 is a front elevation of the operating treadle showing it locked from movement; Fig. 14 is an edge view of the same; Fig. 15 is a plan view of the sliding shelf which supports the printing cards in the lower receptacle and Fig. 16 is an edge view thereof and of the screw.

In these views 1 is a cabinet upon which the platform 2 of the machine is secured.

3 is a hollow arm secured thereon preferably at the rear, in which is pivoted at 4 the arm or lever 5 which operates a vertically moving platen 6. Pivotally mounted in the platform is the revoluble table 7 provided with a series of regularly spaced openings 8, 8. At the outer and inner edges of these openings are the extended openings 9, 9 in which the printing cards or type holders T lie resting upon the inner edge 10 of the platform 2, which is provided with the opening 11, crossed by the supporting ribs 12, 12. The pressing surface of the platen is formed of leather B which has the advantage of a certain amount of elasticity to conform to the surface of the name plate, and at the same time is sufficiently rigid not to emboss the paper as the type are impressed thereon. The leather plate is detachably secured by dove-tailed slots B', B'. The amount of pressure upon the platen is closely regulated by means of a screw threaded stem O which extends through the front portion of the hollow arm 3 at P' and is provided with a nut O'. O$^2$ is a slot in this stem into which the extremity of the rock arm 5 projects. The platen is attached to the reciprocating stem O by means of screws O$^3$ in a plate O$^4$ attached to the stem. The stem O is adjusted before the parts are put together and is threaded only into the nut. In this manner all necessary movement of the parts can be obtained.

The interchangeable receptacles R, R' containing their loads of printing cards T, T are placed one at a time in a pocket S prepared for it upon the platform, and the pocket extends over the revolving table and is provided with vertical wedge like projections 13, 13 which spread apart the spring keepers K, K upon the receptacle and permit the printing cards to drop upon the platform where they lie and are propelled to a printing position underneath the platen 6. As soon as the impression is printed from the printing cards they are carried to a position over the lower receptacle at R$^2$ and there the platform is cut away at 14 to permit the printing cards to fall through.

The lower typeholder receptacle rests in a suitable upper and lower bracket 15 and is provided with a rest plate 16 which is vertically moved downwardly by means of the screw 17 as fast as additional printing cards are added until the entire series has been deposited therein. The screw is rotated by means of the spur gears 18, 19, and 20 driven by the spur gear 21 upon the central spindle P which operates the revolving table.

The rest plate 16 is provided with the sleeve 22 which slides over the screw and carries spring pressed arms 23, 23 which normally engage the thread of the screw and can be released therefrom to raise the rest plate when desired.

The revolving table is secured to the central spindle described which is mounted in the central cross bar 12 of the platform and upon the lower portion of this spindle or shaft are shown two ratchet wheels 30 and 31, having an equal number of teeth, the lower one of which is vertically movable. The upper ratchet wheel rotates the spindle and thereby the revolving table. The pawl 32 is designed to engage and operate these ratchet wheels, either in unison when the lower ratchet wheel is raised as shown in Fig. 12, or the upper one only when the lower one is dropped, or to be out of engagement with both of them when it is designed to repeat the impression from one printing card indefinitely. Any friction device may be employed to prevent rotation of the lower ratchet wheel when not engaged by the pawl.

The pawl 32 is pivoted at 33 upon a reciprocating rod 34 made resilient by means of the inner spring 34' acting upon an inner portion $34^2$ of the bar 34. That is, the inner spring gives elastic pressure to the rod 34 and the pawl is kept in normal engagement with the ratchet wheels by means of the spring 35. The position of the ratchet wheels shown in Fig. 12 is the position for duplicating the impression. This result is obtained by making every alternate tooth 36 on the lower ratchet wheel longer than the corresponding tooth 37 on the upper ratchet wheel. The lower ratchet wheel revolves loosely on the spindle, and the projecting tooth at 38 will lift the pawl out of engagement with the tooth 37 and hence only the lower ratchet wheel will revolve. Hence the pawl will skip every other tooth on the upper ratchet wheel, and two impressions will be made to one forward movement of the revolving table.

The rock arm which operates the platen is moved to lower the platen coincidently with the rearward movement of the reciprocating rod 34, and is raised to lift the platen as the rod 34 and pawl 32 move forward to revolve the table which propels the printing cards. The rock arm and platen therefore move continuously and the pawl acts intermittently and a duplicating of the impression is the result. When a continuous movement of the upper ratchet wheel and consecutive printing from the printing cards is desired in their regular order, the lower ratchet wheel is lowered out of engagement with the pawl and the pawl will engage each tooth on the upper ratchet wheel in turn. When it is desired to repeat one impression indefinitely the lower ratchet wheel is lowered and the pawl is thrown out of engagement with the upper wheel which therefore will not revolve the table. To accomplish these objects the lower ratchet is raised and lowered by means of a lever 40 pivoted at 41 in the frame or rib of the machine, and is provided with the clutching fingers 42, 42 which engage the flange 43 on the sleeve 43' attached to the lower ratchet wheel which slides on the central spindle.

A second lever 44 pivoted at 45 in a link 46 connecting the levers 40 and 44, engages a pin 47, secured to the pawl 32, to which the spring 35 which returns the pawl is attached.

In the front of the frame is secured a plate 48 provided with the vertical slot 49 in which the projecting ends of these levers are movable; at one side of this slot are shown the notches 50, 51, and 52. The notch 50 is of the least depth. When the projecting ends of the levers 40 and 44 are raised to the top of the slot 49 the lower ratchet wheel is lowered out of contact with the pawl and the lever 44 is extended at the inner end to hold the pin 47 and the pawl out of engagement with the upper ratchet wheel. When the levers are placed centrally in the slot the lower ratchet wheel will be out of engagement with the pawl but said pawl will engage the upper ratchet wheel, the notch 51 permitting the outer end of the lever 44 to spread so that the inner end releases the pin 47 and pawl. In this position consecutive impressions can be taken. When the outer ends of the levers are lowered to the bottom of the slot the lower ratchet wheel with the alternate long tooth is brought up to engagement with the pawl and duplicating of the impressions takes place.

It will be seen that the two lower notches 51 and 52 permit of expanding the levers so that the pawl will not be thrown out of engagement with the upper ratchet wheel. The link 46 is loop shaped and permits the levers to be brought together or separated. The lever 44 is normally pressed out at the outer end by the spring 35.

The operating mechanism is shown in Figs. 1, 5, 8, 9, and 10, and may be described as follows: 60 is the treadle secured to a rock shaft 51. To this shaft is secured a rock arm 52. To this arm is pivoted one end of links 53 pivoted at the other end to a rock arm 54 which is secured in turn to a rock shaft 55 passing through the depending arm 56, which operates the bar $34^2$, and also through the lower end E of the printing arm, so that these parts are operated conjointly. The rock arm 57 is secured to the rock shaft 55, and is connected by means of a link 58 to a point 59 upon a disk 60', which forms a fulcrum point for the toggle like mechanism so that when the treadle is pushed outward the lower end of the printing arm and the reciprocating rod to which the arm 56 is attached will also move outward. The disk 60' remains stationary because power is applied equally to all sides thereof. The treadle can be secured from movement and the disk 60' can be rotated by the motor to operate the platen operating arm and reciprocating rod by means of the same mechanism, the action being as shown in dotted lines in Fig. 8, as the disk 60' revolves. When the motor operates the shaft 51 remains immovable since the clutch does not operate when the pedal treadle 60 is secured.

The motor is shown at 61 and a band 62 connects the driving pulley 62' with the disk pulley 63, loosely mounted upon a shaft 64 on which the disk 60' is mounted. Reducing friction gear mechanism of the planetary type is shown in Figs. 9 and 10, where 65 is an intermediate disk fixed upon the shaft 64, upon which disk 65 the friction wheels 66, 66 are pivoted having beveled outer edges 67, 67, which engage the inner inclined edge 68 of the disk 60' which is also loose on the shaft.

The pulley disk is provided with a conical hub 69 adapted to engage the beveled edges 67 of the friction wheels 66, the friction wheels thus intervening between the disk 60' and pulley disk. A toggle clutch device 70 and connecting rod 71 is operated by means of a pedal 72 to bring the parts into engagement and to drive the disk 60'. In Fig. 8 the pedal 72 is shown locked down by means of a latch 73, to keep the friction elements in engagement. This mechanism is shown in position to be operated by the motor, and a clutch operating pedal is also shown for connecting the driving pulley with a speed reducing device. In Fig. 8 is also shown the printing arm, the ratchet and pawl which feed the inking ribbon, the lower receptacle for printing cards, and the screw which automatically lowers the same and one of the operating gears therefor.

A convenient inking device for the type in the printing cards is shown in Figs. 2, 3, 5, and 6 and 7, where 80 is an inking ribbon wound upon two rollers 81 and 82, upon shafts 83 and 84. This ribbon passes under the printing area and is alternately wound in an automatic manner upon the rollers 81 and 82 and the rollers are operated as follows: 85 is a spring pressed pawl secured upon the reciprocating shaft. As the shaft advances each time the pawl engages a ratchet wheel 86 upon a transverse shaft 87 mounted in the frame of the machine. Upon each end of this shaft are bevel gears 88 and 89 adapted to engage alternately with the bevel gears 90 and 91 upon the shafts 83 and 84 respectively. The rolls of inking ribbon themselves are empolyed to shift the transverse shaft 87 and as each roll increases in diameter it will depress a lever 80' shown in Fig. 7 and operate a cranked rod 92 which engages the grooved flange 93 on the shifting shaft 87 and throws it to engage the bevel gear on the other roller shaft with the corresponding gear on the transverse shaft. In this manner when each roll becomes of full diameter the direction of movement of the rollers will be reversed and the ribbon will be rewound on the other roller. At 94 is shown a spring keeper provided with notches 95 and 96 adapted to alternately engage the flange 97 on the shifting shaft and temporarily lock it in position. A rheostat V is employed to control the electric current and a switch is shown at W.

A sliding pin 100 is used to secure the treadle in position, one end of which is inserted in a sliding sleeve 101 on a rod 102 mounted in brackets 104. This sleeve is pressed by springs 105 so that if the card to be printed should be thicker than ordinary the treadle will yield before any part breaks. In Figs. 11 and 12 is shown a bell crank 110 pivoted in the frame and engaged by the inner portion of the bar 34 in its outer movement which strikes against the revolving plate 8 and serves to hold it rigidly from movement while the impression is being made.

In use the device is easily operated selectively by means of the treadle or alternately therewith by means of the motor, the reduction in speed obtained by means of the gear mechanism and double disk permits of the necessary reduction in speed required by the high motor speed.

The table is operated in a progressive and intermittent manner by means of the ratchets and moves the printing cards from one receptacle to the printing position and thence to the second receptacle where they fall through the opening in the platform upon the bracket in the second receptacle, which is lowered the thickness of one card at a time by means of the operating screw 17, and gearing operatively connected with the shaft with which the table rotates. The movements of the table to permit of printing from the cards successively or duplicating the impression, or printing from one card continuously are obtained by means of the fixed and loose ratchet disks, one of which can be made to rise and fall so that the pawl will engage one or both of these selectively or the pawl can be removed so as to be out of engagement with both of them.

I do not desire to claim all possible changes in the structure of parts but desire to protect all mechanism within the scope of the claims.

Having described the invention what I claim as new and desire to secure by Letters Patent is:

1. The combination with the platform of an addressing machine adapted to print from printing cards, said platform having a circular opening, of a rotatable table thereon, said table provided with regularly spaced openings adapted to receive printing cards, rims on said platforms on the inner edge of said opening on which said printing cards rest to be propelled by said table, a vertically reciprocable platen above said table, a pair of interchangeable receptacles for printing cards, one mounted upon said platform, and adapted to supply said openings in said table with printing cards in succession as said table revolves and the other mounted beneath said platform and adapted to receive the used printing cards, means for rotating said table and means for supporting said cards in said lower receptacle, and means operated in unison with said rotating table for lowering the said support for said printing cards as fast as fresh ones are deposited therein.

2. In combination with the platform of an addressing machine, a revoluble table thereon provided with regularly spaced openings, a vertically moving platen with which said openings register in turn, an upper receptacle for printing cards secured upon said platform, and adapted to overhang said table and register with said openings in turn, spring retaining means for said printing cards in said receptacle, a device on said platform for releasing said card retaining means to permit the printing cards to fall by gravity into said openings, a lower receptacle interchangeable with said upper receptacle, a support therefor and a support therein for printing cards, automatically operating mechanism for lowering said support and automatically operating mechanism for rotating said table intermittently, and alternately, with the downward movement of said platen.

3. The combination with a platform, of a rotatable table thereon provided with spaced openings adapted to receive and propel a series of printing cards, a receptacle for said printing cards over said table and adapted to register in turn with said openings as said table rotates, and to deposit in turn one printing card in each opening, a printing mechanism adapted to operate upon said cards at a position spaced from said receptacle, a second receptacle spaced from said printing position and first named receptacle, said second receptacle adapted to receive cards from said table, said platform having an opening permitting said cards to fall therethrough into said second receptacle, means for giving an intermittent progressive movement to said table, including a shaft upon which said table is mounted, a device for supporting said cards in said second receptacle, and mechanism for lowering said card supporting device in said receptacle as fast as supplied thereto, said lowering mechanism operatively connected with said shaft.

4. The combination with a rotatable table and a stationary platform, said table provided with regularly spaced openings, of a shaft on which said table is mounted, a fixed ratchet wheel on said shaft, a movable ratchet wheel on said shaft, a pawl, a reciprocating rod on which said pawl is pivotally mounted, said movable wheel provided with the same number of teeth as the fixed ratchet wheel, every other tooth projecting beyond the corresponding tooth on the fixed wheel, a lever pivoted in said platform and adapted to raise and lower said movable ratchet wheel, and a lever adapted to move said pawl out of engagement with said fixed ratchet wheel.

5. The combination with a platform, of a rotatable shaft and table on said shaft, said table provided with regularly spaced openings, a ratchet wheel fixed on said shaft and rotatable therewith, a movable ratchet wheel loosely mounted on said shaft, a lever pivoted in said platform, and adapted to move said movable ratchet wheel on said shaft, a spring pressed pawl, a reciprocating member to which said pawl is pivoted, an arm secured to said reciprocating member, a rock shaft in said arm, a pair of oppositely extending rock arms secured to said rock shaft, a revoluble disk, a link connecting one of said rock arms eccentrically to said disk and pivoted thereto, a link pivoted in the other rock arm, a treadle and rock arm to which said last named link is pivoted, said last mentioned rock arm pivoted in said platform underneath the same and separate means for rotating said disk, whereby said reciprocating rod can be operated by said disk's mechanism alternately with said treadle.

6. In an addressing machine, the combination with a platform, a rotatable table thereon and operating ratchet wheel therefor, of a reciprocating member in said platform, a pawl thereon adapted to engage said ratchet wheel, a treadle pivoted in said machine, a motor driven disk, and a driving disk, a speed reduction device operatively connecting said disks, and intervening mechanism operatively and selectively connecting said treadle, reciprocating member and driving disk for operating said reciprocating member alternately by said treadle and by said driving disk, one of said actuating members remaining quiet while the other actuating member is operating.

7. In an addressing machine, in combination, a platform, a rotatable table thereon, an actuating ratchet wheel therefor, a pawl, a movable device on which said pawl is pivotally mounted, a driven member, link and rock arm mechanism operatively connecting said movable device and driven member, whereby said movable device is operated by said driven member, a driving member, a reducing mechanism operatively connectible with said driving and driven members, a motor actuating said driving member, a treadle and mechanism operatively connected with said treadle for connecting said reducing mechanism operatively with said driving and driven members.

8. The combination with a platform and rotatable table thereon adapted to convey a series of printing cards to a receptacle, of an upper receptacle from which the printing cards fall by gravity, one at a time, upon said platform, a lower receptacle adapted to receive said cards one at a time, as they are discharged from the table, a card rest in the lower receptacle, a screw engaging the same, a gear mechanism rotatable with said table and operatively connecting said table and screw, whereby said screw is rotated conjointly with said table to lower said cards.

In testimony whereof, I hereunto set my hand this 23d day of May, 1911.

ERNEST H. FREY.

In presence of—
L. R. CANFIELD,
WM. M. MONROE.

Copies of this patent may be obtained for five cents each, by addressing the "Commissioner of Patents, Washington, D. C."